US012586853B2

(12) United States Patent
Tajima

(10) Patent No.: US 12,586,853 B2
(45) Date of Patent: Mar. 24, 2026

(54) BATTERY PACK

(71) Applicant: Prime Planet Energy & Solutions, Inc., Tokyo (JP)

(72) Inventor: Mitsutoshi Tajima, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 595 days.

(21) Appl. No.: 17/986,779

(22) Filed: Nov. 14, 2022

(65) Prior Publication Data

US 2023/0155232 A1 May 18, 2023

(30) Foreign Application Priority Data

Nov. 15, 2021 (JP) ................................. 2021-185645

(51) Int. Cl.
H01M 50/24 (2021.01)
H01M 50/209 (2021.01)
H01M 50/271 (2021.01)

(52) U.S. Cl.
CPC ......... H01M 50/24 (2021.01); H01M 50/209 (2021.01); H01M 50/271 (2021.01)

(58) Field of Classification Search
CPC ... H01M 50/209; H01M 50/24; H01M 50/271
See application file for complete search history.

(56) References Cited

U.S. PATENT DOCUMENTS

2012/0114999 A1 5/2012 Park et al.
2016/0293914 A1* 10/2016 Miller ................. H01M 50/271

2016/0344059 A1* 11/2016 Mack .................. H01M 50/229
2018/0361874 A1* 12/2018 Kobayashi .......... H01M 50/227
2020/0052252 A1 2/2020 Smith et al.
2023/0207946 A1 6/2023 Chen et al.
2023/0411768 A1* 12/2023 Shimizu .............. H01M 50/213

FOREIGN PATENT DOCUMENTS

| | | |
|---|---|---|
| CN | 103138028 A | 6/2013 |
| CN | 106004400 A | 10/2016 |
| CN | 107912071 A | 4/2018 |
| CN | 109148759 A | 1/2019 |
| CN | 110828721 A | 2/2020 |
| CN | 112331976 A | 2/2021 |
| EP | 2595216 A1 | 5/2013 |

(Continued)

*Primary Examiner* — Jonathan G Jelsma

(74) *Attorney, Agent, or Firm* — HAUPTMAN HAM, LLP

(57) ABSTRACT

A battery pack includes: a plurality of battery cells arranged side by side along a first direction; and a case having an inner space for accommodating the plurality of battery cells. The case includes a first member, a second member that forms the inner space together with the first member, and a sealing portion that seals a joining portion between the first member and the second member. The first member has a first portion in abutment with the sealing portion. The second member has a second portion facing the first portion with the sealing portion being interposed between the second portion and the first portion. When an expansion pressure of the inner space acts on the case, a force in a shearing direction acts on the sealing portion sandwiched between the first portion and the second portion.

6 Claims, 12 Drawing Sheets

(56)             References Cited

FOREIGN PATENT DOCUMENTS

| | | | |
|----|-------------|----|---------|
| JP | 2000-294212 | A  | 10/2000 |
| JP | 2003-017019 | A  | 1/2003  |
| JP | 2011100619  | A  | 5/2011  |
| JP | 2017069156  | A  | 4/2017  |
| JP | 2017-152165 | A  | 8/2017  |
| JP | 2021-122001 | A  | 8/2021  |
| WO | 2019031075  | A1 | 2/2019  |

* cited by examiner

210A

A

211A

240A

Z

221A

A

220A

210

200

220

230

VIII

211

221

Z

BATTERY PACK

This nonprovisional application is based on Japanese Patent Application No. 2021-185645 filed on Nov. 15, 2021 with the Japan Patent Office, the entire contents of which are hereby incorporated by reference.

BACKGROUND OF THE INVENTION

Field of the Invention

The present technology relates to a battery pack.

Description of the Background Art

Attempts have been conventionally made to improve waterproofness of a battery pack. For example, Japanese Patent Laying-Open No. 2011-100619 discloses a battery pack including a sealing member provided at a joining surface between a case body and a cover plate to seal the joining interface in a waterproof state.

SUMMARY OF THE INVENTION

The conventional structure is based on such a premise that the pack case is dissembled afterward. On the other hand, there is room for further improvement in strength against an expansion pressure of the case. It is an object of the present technology to provide a battery pack having a large strength against an expansion pressure of a case.

A battery pack according to the present technology includes: a plurality of battery cells arranged side by side along a first direction; and a case having an inner space for accommodating the plurality of battery cells. The case includes a first member, a second member that forms the inner space together with the first member, and a sealing portion that seals a joining portion between the first member and the second member. The first member has a first portion in abutment with the sealing portion. The second member has a second portion facing the first portion with the sealing portion being interposed between the second portion and the first portion. When an expansion pressure of the inner space acts on the case, a force in a shearing direction acts on the sealing portion sandwiched between the first portion and the second portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
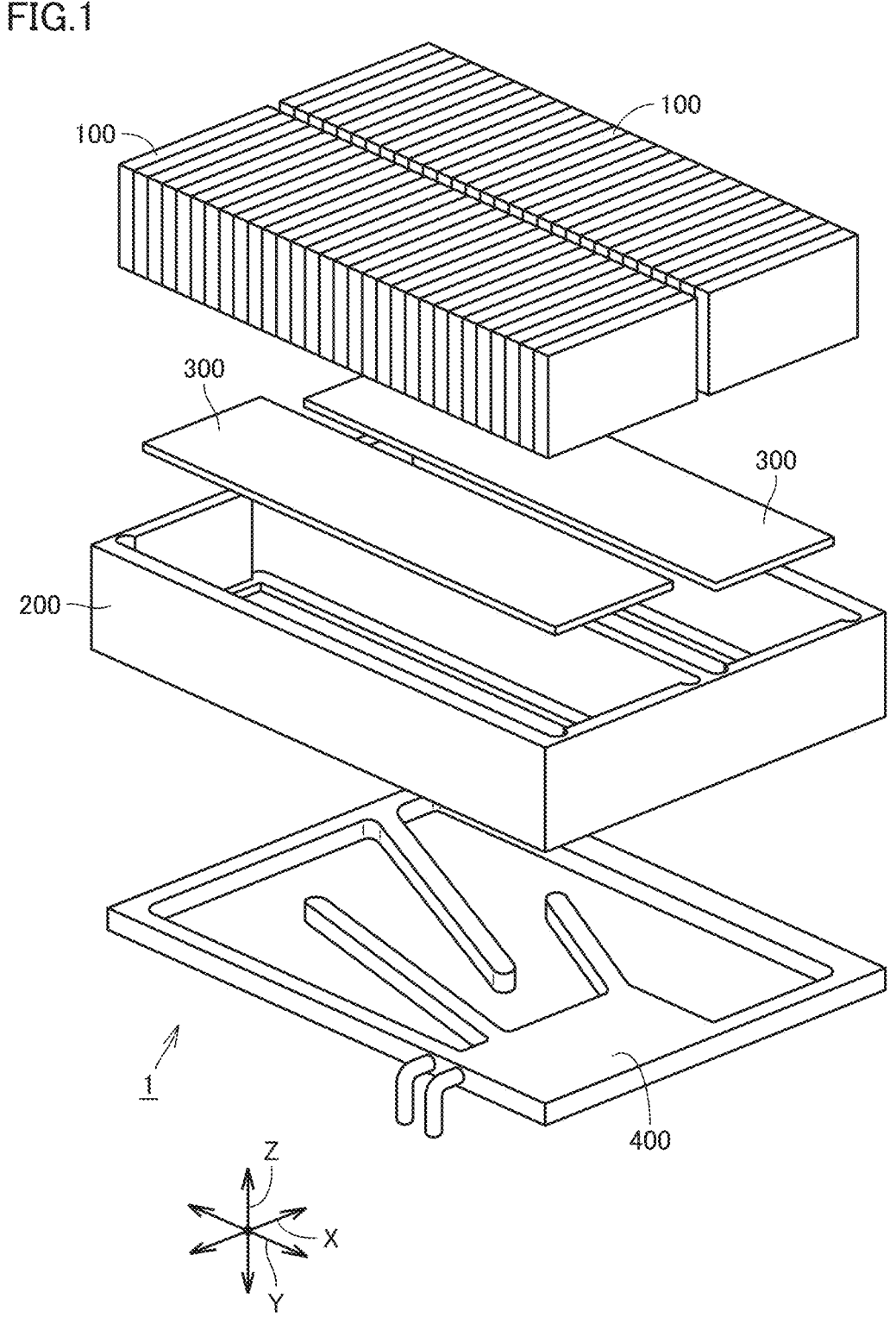
FIG. 1 is an exploded perspective view showing a configuration of a battery pack.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

FIG. 1 is an exploded perspective view showing a configuration of a battery pack 1. Battery pack 1 includes a plurality of battery cells 100, a case 200, heat conducting members 300, and a cooling plate 400.

The plurality of battery cells 100 are stacked along a Y axis direction (first direction). Case 200 accommodates the plurality of battery cells 100. Case 200 may be a casted part (die cast material) composed of a metal material such as aluminum or magnesium, or may be a press-molded part composed of a carbon-containing material. Case 200 is not limited to the above configuration, and may be any case as long as predetermined characteristics such as strength, heat radiation, and thermal conductivity are satisfied. For example, in some cases, case 200 may be composed of a resin.

Each of heat conducting members 300 is provided between battery cell 100 and case 200, and promotes transfer of heat generated in battery cell 100 to case 200.

Cooling plate 400 (heat radiation promoting mechanism) promotes radiation of heat from case 200. As an example, cooling plate 400 is a water-cooling type cooling unit including a flow path through which coolant is to flow; however, the heat radiation promoting mechanism is not limited to such a water-cooling type cooling device, and a forced air cooling type heat radiation promoting mechanism or a natural heat radiation type heat radiation promoting mechanism (such as a heat radiation fin) may be used, for example. Moreover, case 200 and cooling plate 400 may be integrated with each other, or cooling plate 400 may be provided inside case 200. The radiation of heat from battery cell 100 is not limited to indirect radiation of heat via case 200, and may be direct radiation of heat from battery cell 100.

Figure 2:
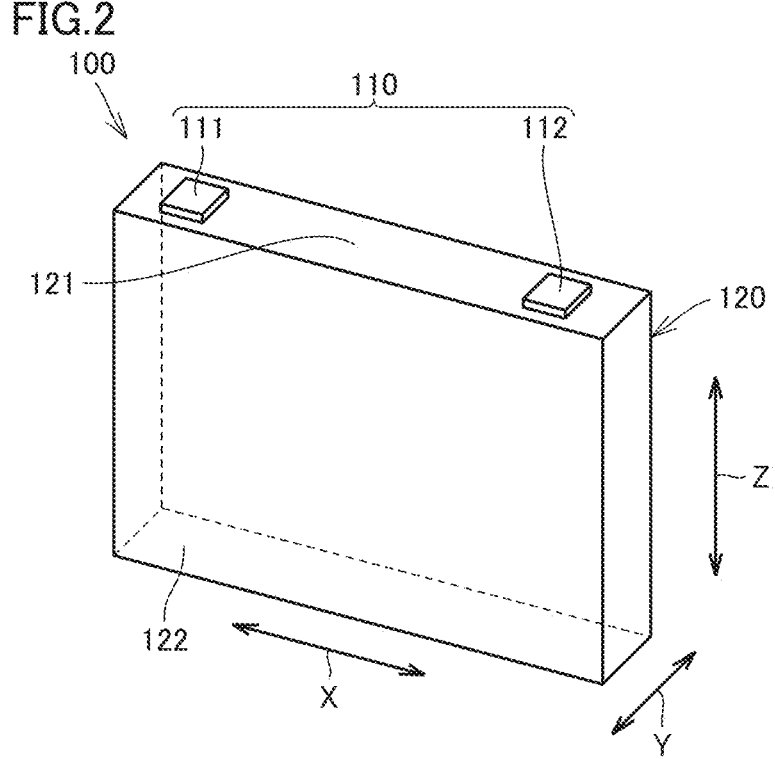
FIG. 2 is a diagram showing a battery cell included in the battery module.

FIG. 2 is a diagram showing battery cell 100. As shown in FIG. 2, battery cell 100 includes electrode terminals 110 and a housing 120. Electrode terminals 110 include a positive electrode terminal 111 and a negative electrode terminal 112. Electrode terminals 110 are formed on housing 120. An electrode assembly (not shown) and an electrolyte solution (not shown) are accommodated in housing 120.

Housing 120 is formed to have a flat rectangular parallelepiped shape. Housing 120 has an upper surface 121 and a bottom surface 122 each extending along an X-Y plane. Upper surface 121 and bottom surface 122 face each other along a Z axis direction (second direction).

As an example, battery cell 100 is a lithium ion battery. Battery cell 100 may be another battery such as a nickel-metal hydride battery. Moreover, the battery cell according to the present technology is not limited to the prismatic battery cell, and may be, for example, a cylindrical battery cell.

Figure 3:
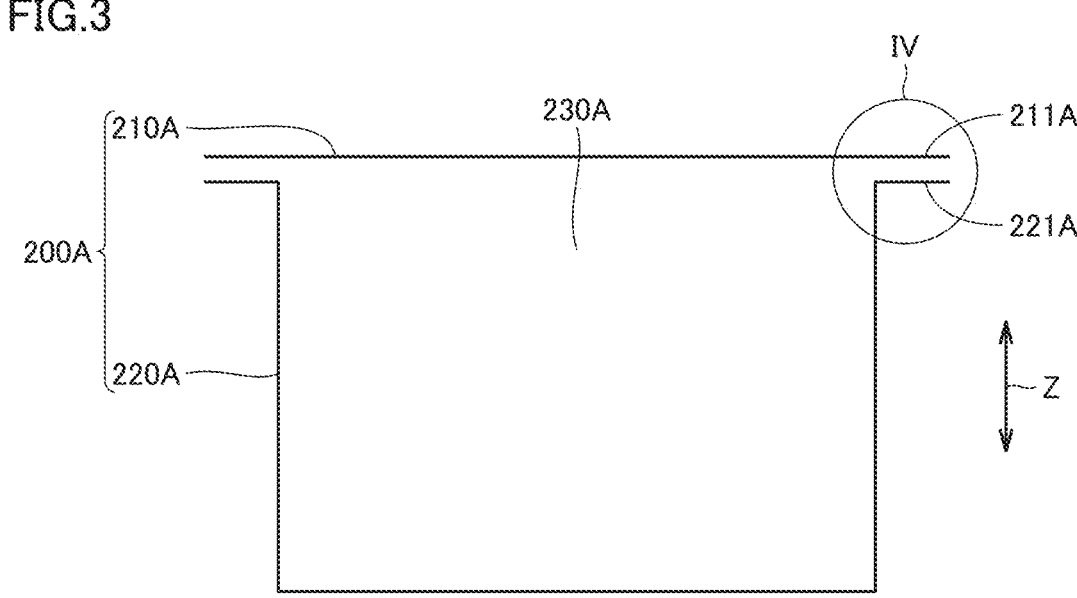
FIG. 3 is a diagram showing a schematic shape of a case of a battery pack according to a comparative example 1.
Figure 4:
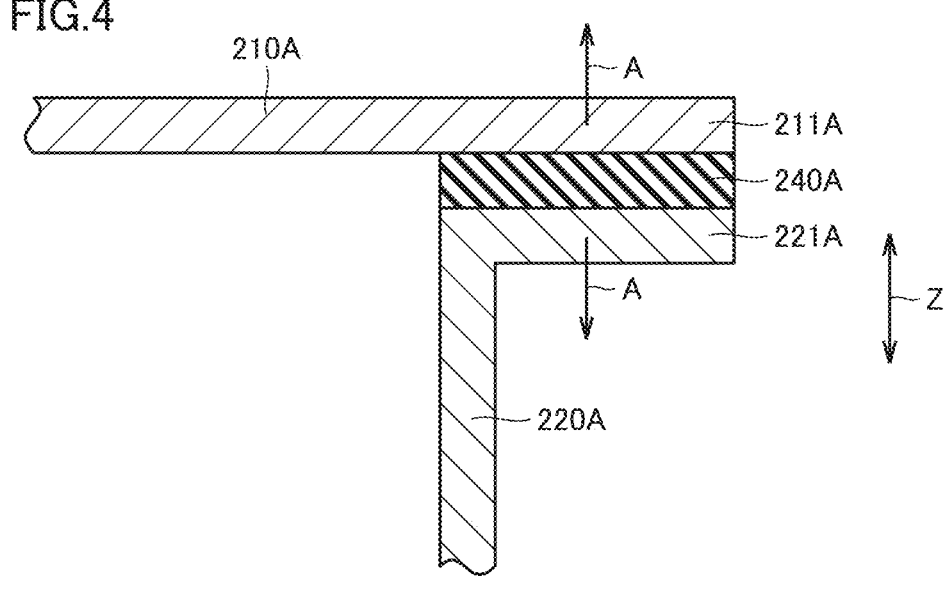
FIG. 4 is a cross sectional view showing a shape of a portion IV in FIG. 3.

FIG. 3 is a diagram showing a schematic shape of a case 200A according to a comparative example 1, and FIG. 4 is a cross sectional view showing a shape of a portion IV in FIG. 3.

As shown in FIG. 3, case 200A includes a first member 210A and a second member 220A that forms an inner space 230A together with first member 210A.

As shown in FIG. 4, a sealing portion 240A is provided to seal a joining portion between first member 210A and second member 220A. First member 210A has a first portion 211A in abutment with sealing portion 240A, and second member 220A has a second portion 221A facing first portion 211A with sealing portion 240A being interposed therebetween.

Sealing portion 240A is provided along the X-Y plane orthogonal to the Z axis direction. When a pressure of an inner space 230A of case 200A is increased, forces in detachment directions (directions of arrows A in FIG. 4) act on sealing portion 240A sandwiched between first portion 211A of first member 210A and second portion 221A of second member 220A.

Figure 5:
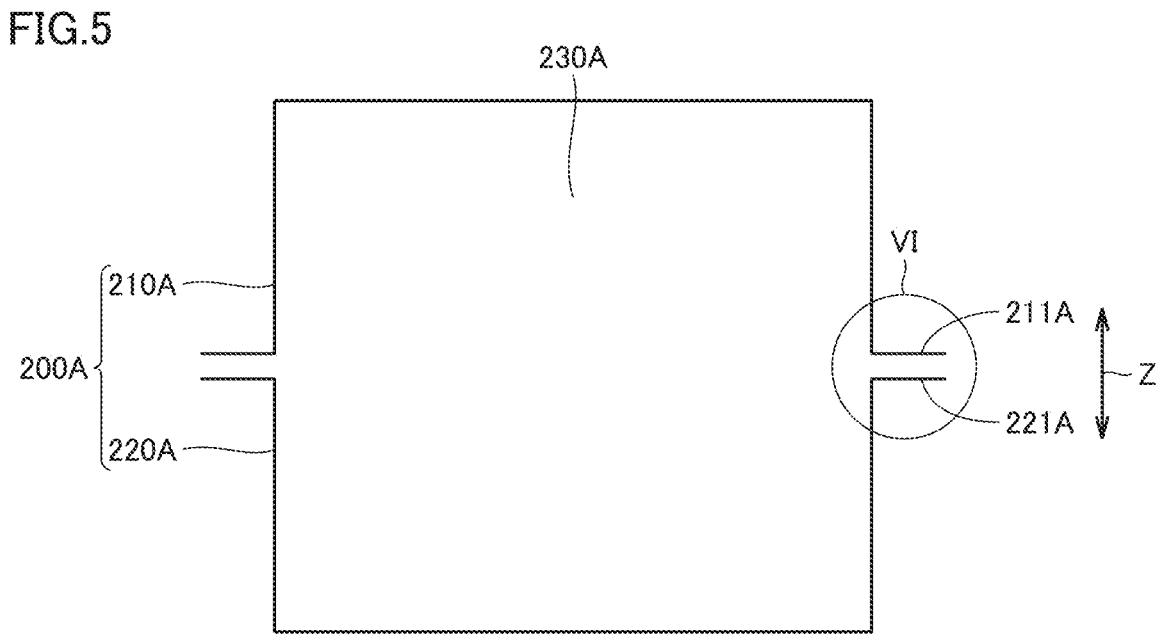
FIG. 5 is a diagram showing a schematic shape of a case of a battery pack according to a comparative example 2.
Figures 6, 7:
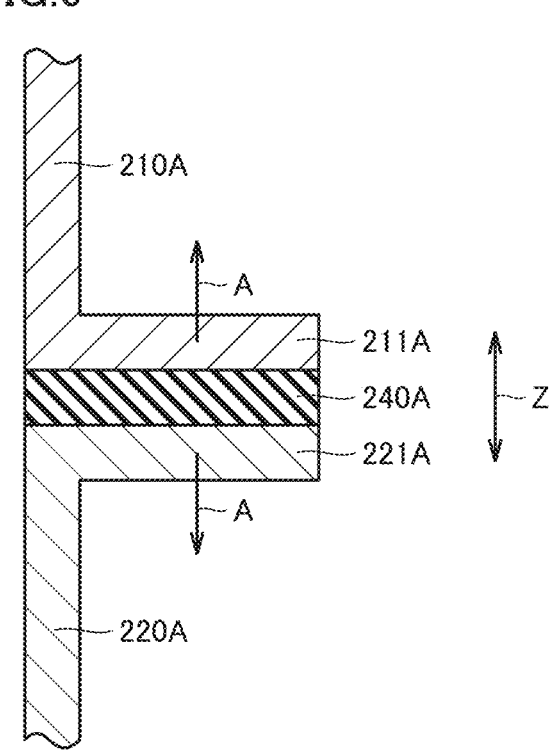
FIG. 6 is a cross sectional view showing a shape of a portion VI in FIG. 5.
FIG. 7 is a diagram showing a schematic shape of a case of a battery pack according to one embodiment.

FIG. 5 is a diagram showing a schematic shape of a case of a battery pack according to a comparative example 2, and FIG. 6 is a cross sectional view showing a shape of a portion VI in FIG. 5.

Also in comparative example 2 shown in FIGS. 5 and 6, a sealing portion 240A is provided along the X-Y plane orthogonal to the Z axis direction. When a pressure of an inner space 230A is increased, forces in the detachment directions (directions of arrows A in FIG. 6) act on sealing portion 240A sandwiched between first portion 211A of first member 210A and second portion 221A of second member 220A.

Figure 8:
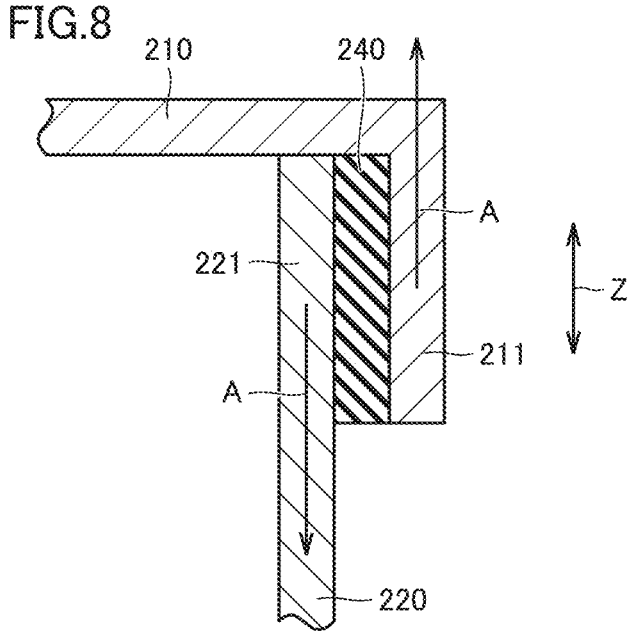
FIG. 8 is a cross sectional view showing a shape of a portion VIII in FIG. 7.

FIG. 7 is a diagram showing a schematic shape of case 200 of the battery pack according to the present embodiment, and FIG. 8 is a cross sectional view showing a shape of a portion VIII in FIG. 5.

As shown in FIG. 7, case 200 has an inner space 230 for accommodating the plurality of battery cells 100. Case 200 includes a first member 210 and a second member 220 that forms inner space 230 together with first member 210. First member 210 constitutes a cover portion of case 200, and second member 220 constitutes a bottom portion of case 200.

As shown in FIG. 8, a sealing portion 240 is provided to seal a joining portion between first member 210 and second member 220. First member 210 has a first portion 211 in abutment with sealing portion 240, and second member 220 has a second portion 221 facing first portion 211 with sealing portion 240 being interposed therebetween.

Sealing portion 240 is provided along a side wall portion of case 200. The side wall portion of case 200 extends in the Z axis direction substantially in parallel with a side surface of battery cell 100. Sealing portion 240 is provided along the Z axis direction. Sealing portion 240 is provided along the entire periphery of case 200 on the X-Y plane. In this way, inner space 230 of case 200 is sealed.

For example, when one of the plurality of battery cells 100 exhibits thermal runaway to emit gas from housing 120, the pressure of inner space 230 of case 200 is increased. The increased pressure of inner space 230 acts on case 200 as an expansion pressure. On this occasion, forces in shearing directions (directions of arrows A in FIG. 8) act on sealing portion 240 sandwiched between first portion 211 of first member 210 and second portion 221 of second member 220.

In the battery pack according to the present embodiment, when the expansion pressure acts on case 200, the forces in the shearing directions, rather than the detachment directions, act on sealing portion 240, with the result that a large strength can be obtained as compared with a case where forces in the detachment directions act on sealing portion 240. In each of the battery packs according to comparative examples 1 and 2, it is expected to disassemble case 200A (remove first member 210A from second member 220A) after assembling case 200A, whereas case 200 according to the present embodiment is obtained based on such a change in thinking that it is not necessarily premised that case 200 is disassembled.

Figure 9:
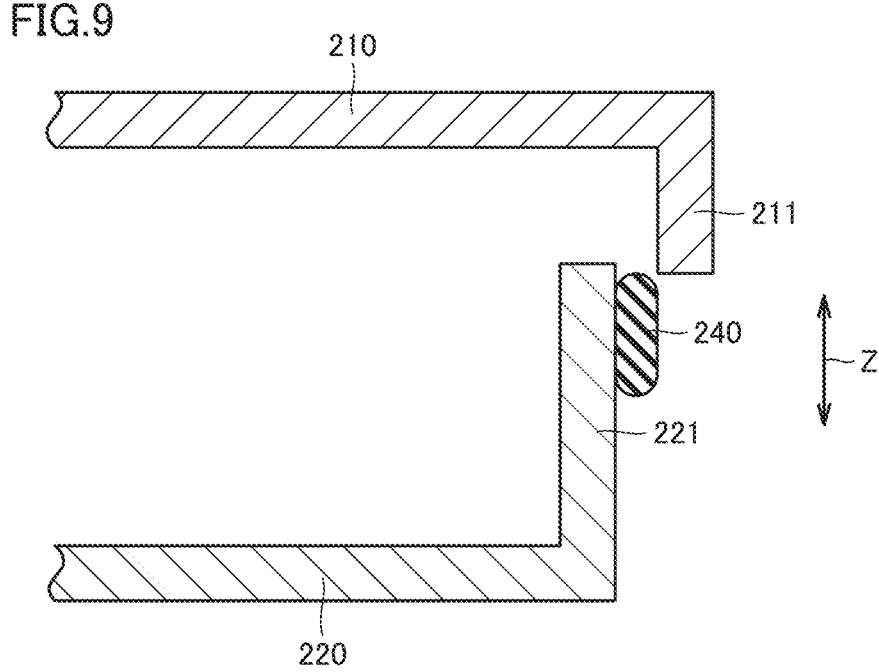
FIG. 9 is a diagram showing a state before a case of a battery pack according to an example 1 is assembled.
Figure 10:
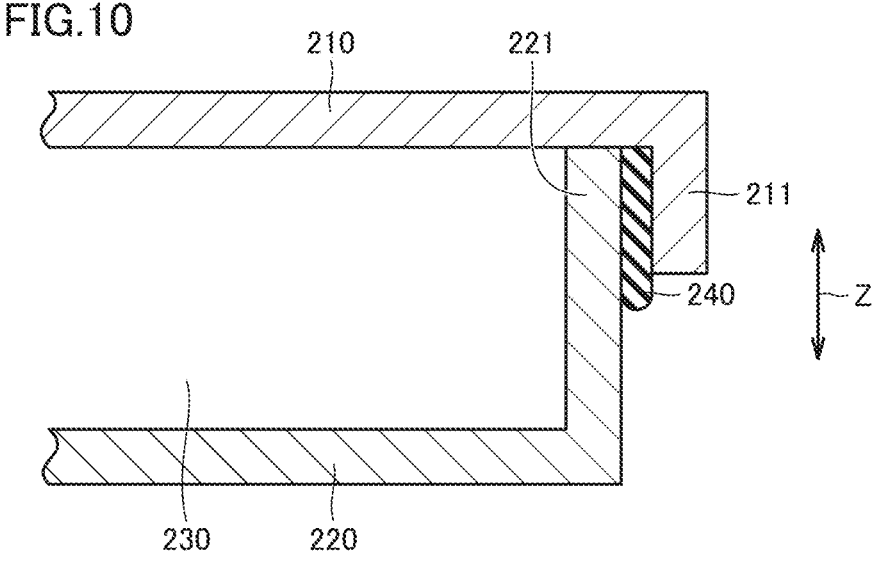
FIG. 10 is a diagram showing a state in which the case of the battery pack according to example 1 is assembled.

Each of FIGS. 9 and 10 is a diagram showing a case 200 according to an example 1. FIG. 9 shows a state before case 200 is assembled, and FIG. 10 shows a state in which case 200 is assembled.

In example 1 shown in FIGS. 9 and 10, first portion 211 of first member 210 is located on the outer side of case 200 with respect to second portion 221 of second member 220. First portion 211 and second portion 221 extend in parallel with each other. Each of first portion 211 and second portion 221 is formed to extend in the Z axis direction.

Figure 11:
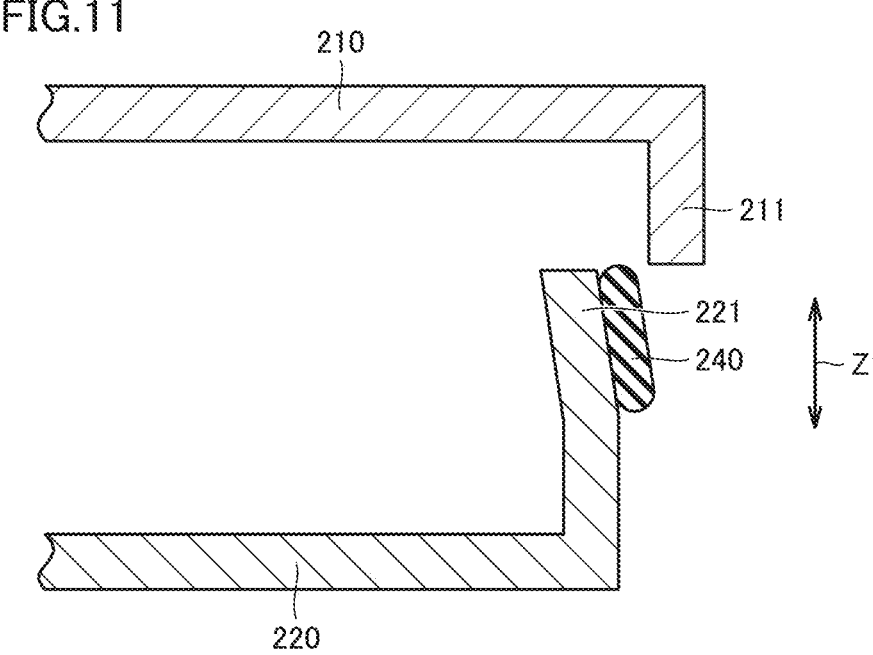
FIG. 11 is a diagram showing a state before a case of a battery pack according to an example 2 is assembled.
Figure 12:
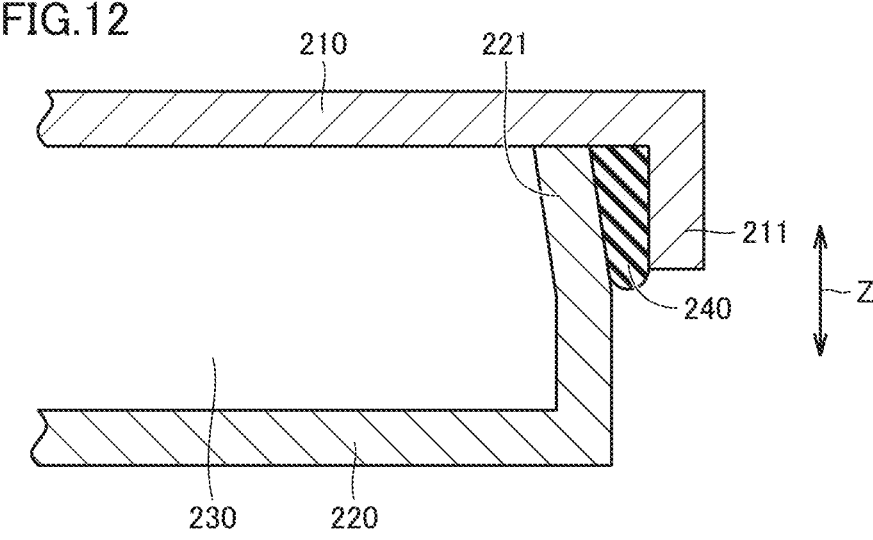
FIG. 12 is a diagram showing a state in which the case of the battery pack according to example 2 is assembled.

Each of FIGS. 11 and 12 is a diagram showing a case 200 according to an example 2. FIG. 11 shows a state before case 200 is assembled, and FIG. 12 shows a state in which case 200 is assembled.

Also in example 2 shown in FIGS. 11 and 12, as with example 1, first portion 211 of first member 210 is located on the outer side of case 200 with respect to second portion 221 of second member 220. First portion 211 is formed to extend in the Z axis direction. Second portion 221 is inclined with respect to the Z axis direction in the direction toward its tip side so as to orient toward the inner side of case 200. Accordingly, first portion 211 and second portion 221 are separated further away from each other (an interval therebetween is increased) in a direction from the root side of second portion 221 (the bottom portion side of case 200) toward the tip side of second portion 221 (the cover portion side of case 200). Since second portion 221 is inclined as described above, first member 210 and second member 220 are readily combined with each other. Further, since sealing portion 240 can be received by second portion 221 from the bottom portion side of case 200, a sealing material can be suppressed from flowing down when combining first member 210 and second member 220 with each other.

Figure 13:
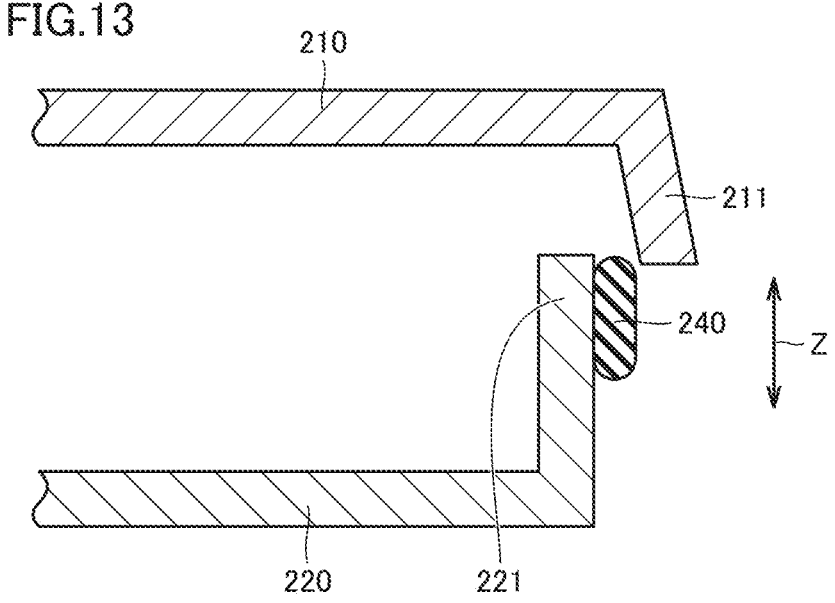
FIG. 13 is a diagram showing a state before a case of a battery pack according to an example 3 is assembled.
Figure 14:
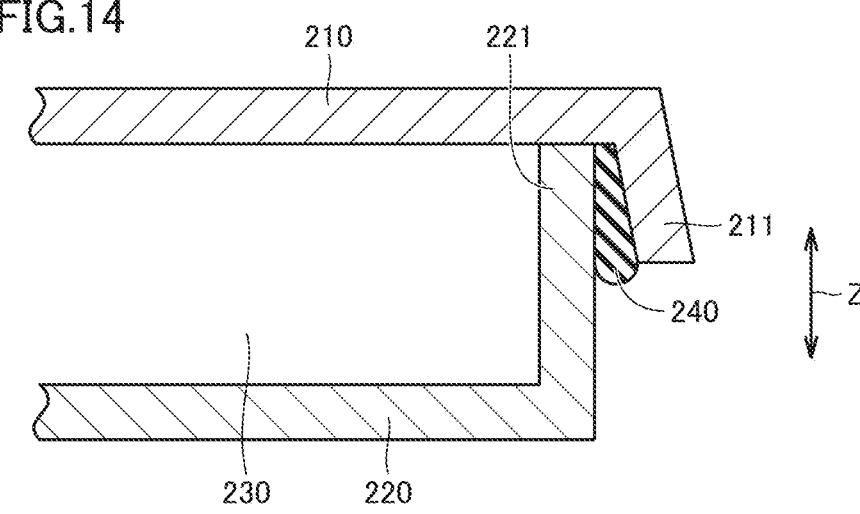
FIG. 14 is a diagram showing a state in which the case of the battery pack according to example 3 is assembled.

Each of FIGS. 13 and 14 is a diagram showing a case 200 according to an example 3. FIG. 13 shows a state before case 200 is assembled, and FIG. 14 shows a state in which case 200 is assembled.

Also in example 3 shown in FIGS. 13 and 14, as with each of examples 1 and 2, first portion 211 of first member 210 is located on the outer side of case 200 with respect to second portion 221 of second member 220. First portion 211 is inclined with respect to the Z axis direction in the direction toward its tip side so as to orient toward the outer side of case 200. Second portion 221 is formed to extend in the Z axis direction. Accordingly, first portion 211 and second portion 221 are separated further away from each other (an interval therebetween is increased) in a direction from the root side of first portion 211 (the cover portion side of case 200) toward the tip side of first portion 211 (the bottom portion side of case 200). Since first portion 211 is inclined as described above, first member 210 and second member 220 are readily combined with each other. Further, in the structure of example 3, the members can be processed more readily than those in the structure of example 2.

Figure 15:
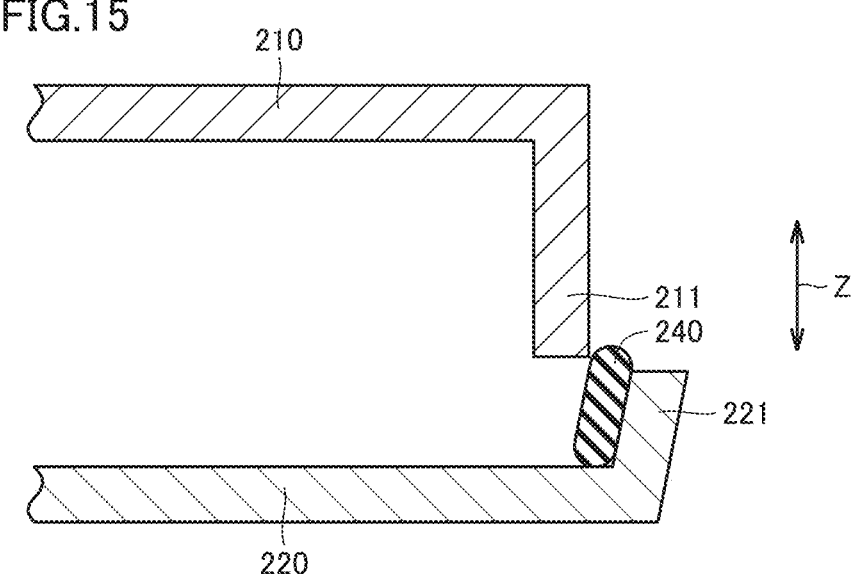
FIG. 15 is a diagram showing a state before a case of a battery pack according to an example 4 is assembled.
Figure 16:
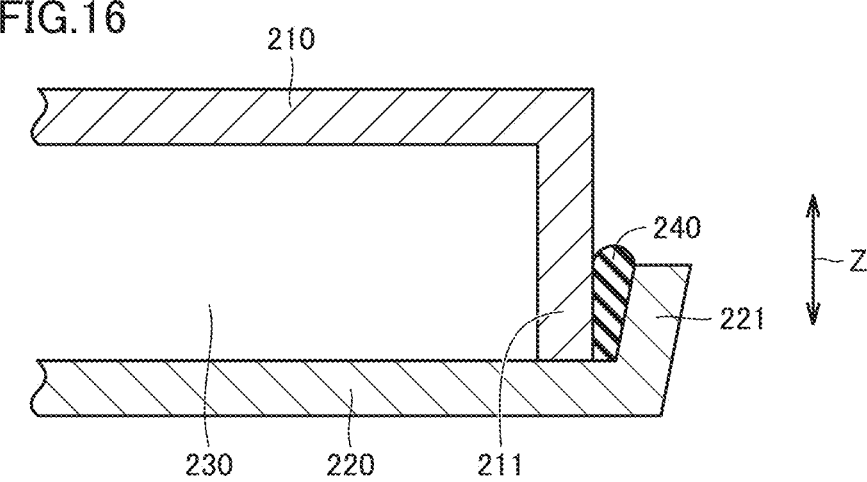
FIG. 16 is a diagram showing a state in which the case of the battery pack according to example 4 is assembled.

Each of FIGS. 15 and 16 is a diagram showing a case 200 according to an example 4. FIG. 15 shows a state before case 200 is assembled, and FIG. 16 shows a state in which case 200 is assembled.

In example 4 shown in FIGS. 15 and 16, first portion 211 of first member 210 is located on the inner side of case 200 with respect to second portion 221 of second member 220. First portion 211 is formed to extend in the Z axis direction. Second portion 221 is inclined with respect to the Z axis direction in a direction toward its tip side so as to orient toward the outer side of case 200. Accordingly, first portion 211 and second portion 221 are separated further away from each other (an interval therebetween is increased) in a direction from the root side of second portion 221 (the bottom portion side of case 200) toward the tip side of second portion 221 (the cover portion side of case 200). Since second portion 221 is inclined as described above, first member 210 and second member 220 are readily combined. Further, since sealing portion 240 can be received by second portion 221 from the bottom portion side of case 200, the sealing material can be suppressed from flowing down when combining first member 210 and second member 220 with each other. Further, in the structure of example 4, as with the structure of example 3, the members can be processed more readily than those in the structure of example 2. Further, since first portion 211 and second portion 221 are formed to expose the end portion of sealing portion 240 on the cover portion side of case 200, sealing portion 240 can be recognized from the upper side (cover portion side) of case 200 when combining first member 210 and second member 220 with each other, thereby facilitating positioning.

Figure 17:
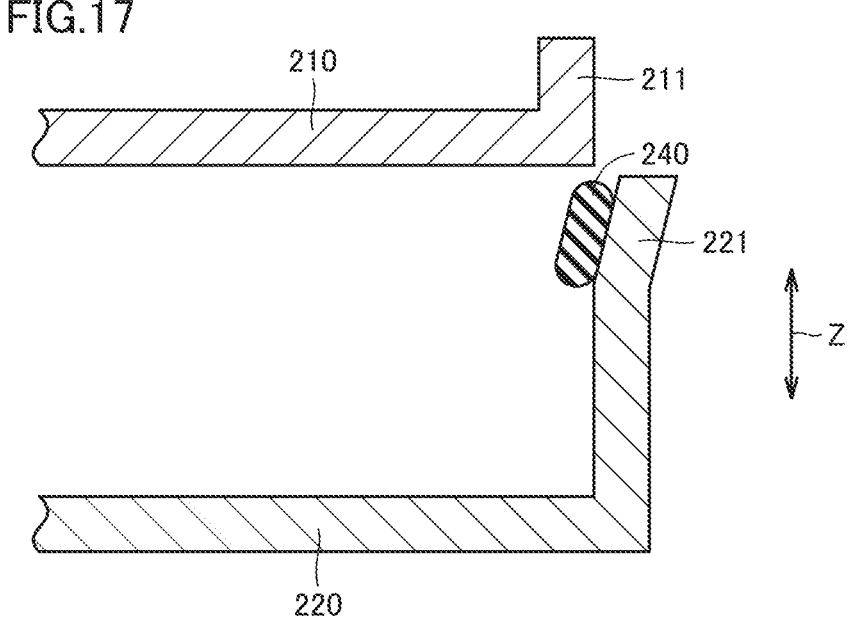
FIG. 17 is a diagram showing a state before a case of a battery pack according to an example 5 is assembled.
Figure 18:
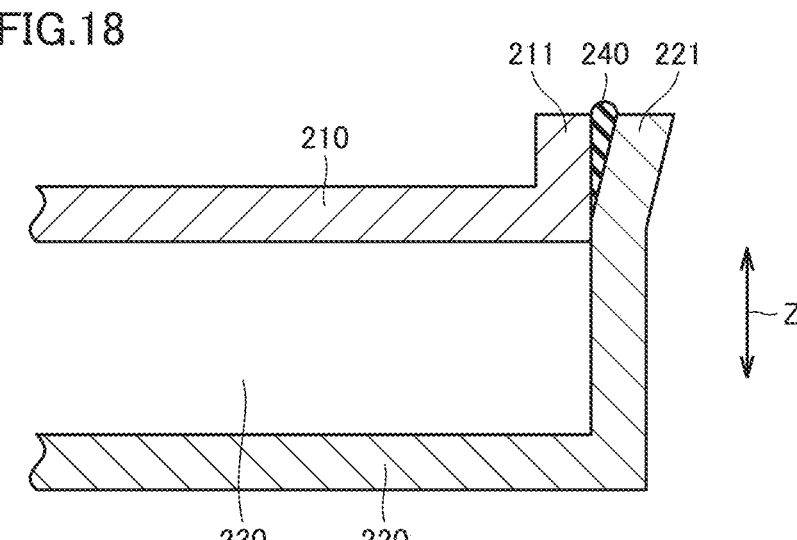
FIG. 18 is a diagram showing a state in which the case of the battery pack according to example 5 is assembled.

Each of FIGS. 17 and 18 is a diagram showing a case 200 according to an example 5. FIG. 17 shows a state before case 200 is assembled, and FIG. 18 shows a state in which case 200 is assembled.

Also in example 5 shown in FIGS. 17 and 18, as with example 4, first portion 211 of first member 210 is located on the inner side of case 200 with respect to second portion 221 of second member 220. Second portion 221 of second member 220 is formed to have its tip located in a direction away from the bottom portion of case 200. Second portion 221 is inclined with respect to the Z axis direction in a direction toward its tip side so as to orient toward the outer side of case 200. First portion 211 is formed to extend in the Z axis direction. Accordingly, first portion 211 and second portion 221 are separated further away from each other (an interval therebetween is increased) in a direction from the root side of first portion 211 (the cover portion side of case 200) toward the tip side of first portion 211 (the bottom portion side of case 200). Since second portion 221 is inclined as described above, first member 210 and second member 220 are readily combined with each other. Further, since first portion 211 and second portion 221 are formed to expose the end portion of sealing portion 240 on the cover portion side of case 200, sealing portion 240 can be recognized from the upper side (the cover portion side) of case 200 when combining first member 210 and second member 220 with each other, thereby facilitating positioning.

Figure 19:
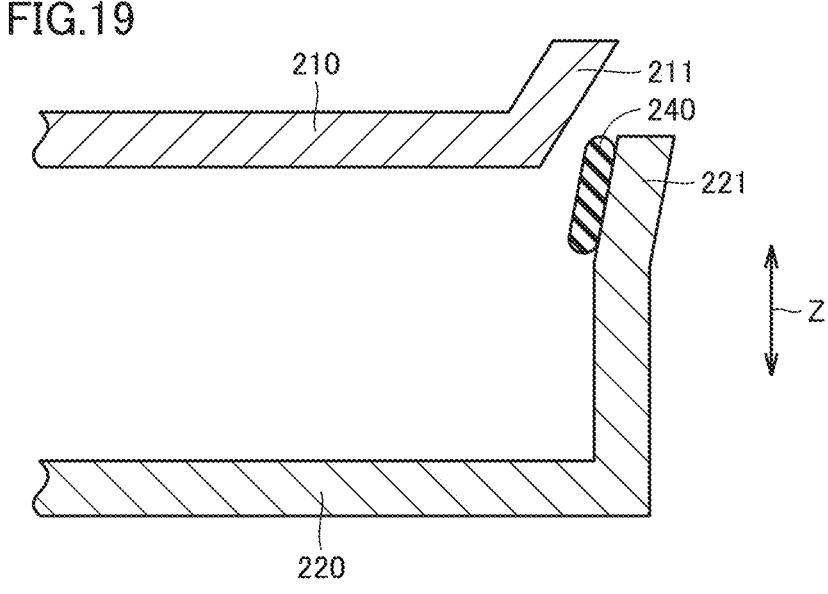
FIG. 19 is a diagram showing a state before a case of a battery pack according to an example 6 is assembled.
Figure 20:
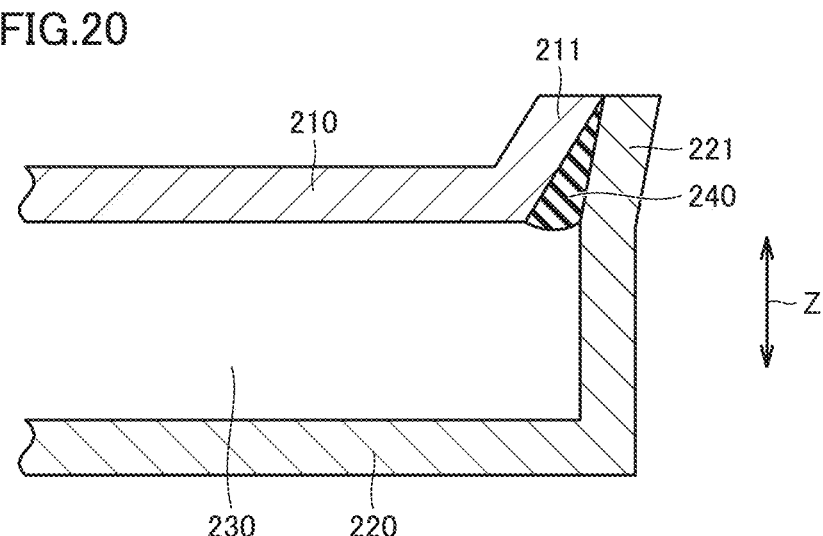
FIG. 20 is a diagram showing a state in which the case of the battery pack according to example 6 is assembled.

Each of FIGS. 19 and 20 is a diagram showing a case 200 according to an example 6. FIG. 19 shows a state before case 200 is assembled, and FIG. 20 shows a state in which case 200 is assembled.

Also in example 6 shown in FIGS. 19 and 20, as with example 5, second portion 221 of second member 220 is formed to have its tip located in a direction away from the bottom portion of case 200. Each of first portion 211 and second portion 221 is inclined with respect to the Z axis direction in a direction toward its tip side so as to orient toward the outer side of case 200. First portion 211 and second portion 221 are closer to each other (an interval therebetween is decreased) in a direction from the root side of each of first portion 211 and second portion 221 (the cover portion side of case 200) toward its tip side (the bottom portion side of case 200). Since second portion 221 is inclined as described above, sealing portion 240 can be received by second portion 221 from the bottom portion side of case 200, with the result that a sealing material can be suppressed from flowing down when combining first member 210 and second member 220 with each other.

Figure 21:
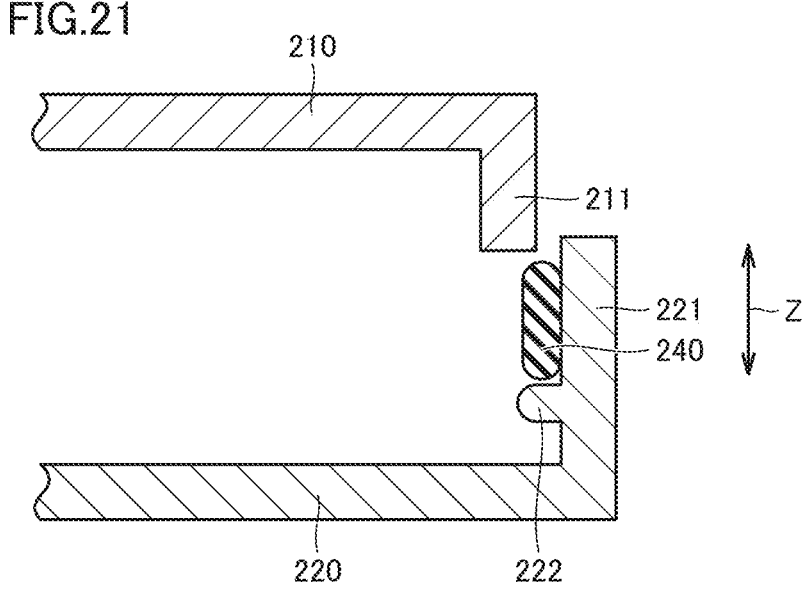
FIG. 21 is a diagram showing a state before a case of a battery pack according to an example 7 is assembled.
Figure 22:
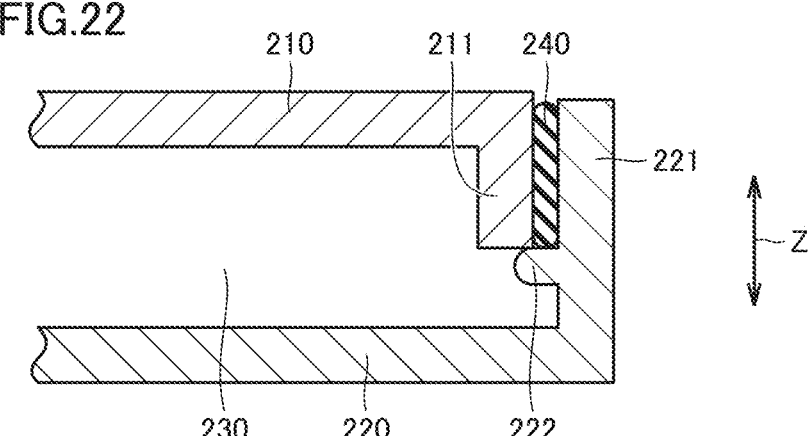
FIG. 22 is a diagram showing a state in which the case of the battery pack according to example 7 is assembled.

Each of FIGS. 21 and 22 is a diagram showing a case 200 according to an example 7. FIG. 21 shows a state before case 200 is assembled, and FIG. 22 shows a state in which case 200 is assembled.

In example 7 shown in FIGS. 21 and 22, first portion 211 of first member 210 is located on the inner side of case 200 with respect to second portion 221 of second member 220. A protrusion 222 is formed on a side wall of second member 220 so as to protrude toward inner space 230. When first member 210 and second member 220 are combined with each other, the tip of first portion 211 is in abutment with protrusion 222.

As long as sealing characteristics are ensured, the thickness of sealing portion 240 when first member 210 and second member 220 are combined with each other is preferably as small as possible, such as about 10 mm or less.

The length of sealing portion 240 in the Z axis direction when first member 210 and second member 220 are combined with each other is appropriately determined in accordance with the characteristics of the sealing material, the size of case 200, and the like, and is preferably, for example, about 100 mm or less.

Sealing portion 240 can be formed using, for example, the following materials.

(1) Materials in Gel Form (a) Sikaflex221 (polyurethane-based) of moisture-curable type [manufactured by sika]

Chemical resistance: resistant to fresh water, seawater, lime water, drained/waste water, dilute acid, and dilute alkaline solution.

Hardness (CQP023-1/ISO868): ShoreA40

Tensile strength (CQP036-1/ISO37): 1.8 MPa

Elongation at break (CQP036-1/ISO37): 500%

Tear strength (CQP045-1/ISO34): 7 N/mm

Long-term heat resistance temperature (CQP513-1): +90° C.

Short-term heat resistance temperature: about +120° C. for 1 day at maximum; about +140° C. for 1 hour at maximum Applied temperature range: −40° C. to +90° C.

(b) BESIL9339 (silicone-based) of room-temperature-curable type [manufactured by BEGINOR]

Hardness (GB/T531-2008): ShoreA40

Tensile strength (CQP036-1/ISO37): 2.8 MPa

Elongation at break (GB/T528-2009): 500%

Shear strength (GB/T7124-2008): 2.3 MPa

Applied temperature range: −60° C. to +250° C.

(c) DOWSILEA-4700 (silicone-based) of room-temperature-curable type [manufactured by Toray]

Hardness: JIS Type A19

Tensile strength (CQP036-1/ISO37): 3.7 MPa

Elongation at break (GB/T528-2009): 630%

Applied temperature range: −45 to 150° C.

(d) SU-3802 (urethane-based) of room-temperature-curable type [manufactured by SANYU REC].

Chemical resistance: LLC, engine oil

Hardness: ASTMD2240, TypeA43

Elastic modulus (DMS method): 2.4 MPa

Tensile strength (JISK6301): 1.5 MPa

Elongation at break (JISK6301): 100%

(e) MS650 (modified-silane-based) of moisture-curable type [manufactured by Henkel]

Hardness (ISO868, Durometer A): ShoreA60

Tensile strength (ISO37): 3.0 MPa

Elongation at break (ISO37): 180%

8

Shear strength (DINEN1465): 2.0 MPa

Applied temperature range: −40° C. to +90° C.

(f) EAE-60HP (epoxy-based) of room-temperature-curable type [manufactured by Henkel]

Chemical resistance: organic solvent

Hardness (ISO868, Durometer D): 80

Tensile strength (ISO527-2): 35 MPa

Elongation at break (ISO527-3): 9%

(2) Reworkable Materials (a) TB3081J (acrylic-based) of UV-curable type [manufactured by ThreeBond]

Heat resistance and cold resistance

Hardness (3TS-215-01, Durometer A): A27

Elastic modulus (3TS-501-04): 2.1 MPa

Tensile strength (3TS-320-01): 1.8 MPa

Elongation at break (3TS-320-01): 180%

Applied temperature range: −40° C. to +120° C.

(b) LoctiteAA5884 (acrylic-based) of UV-curable type [manufactured by Henkel]

Chemical resistance: oil resistance

Hardness (ISO868, Durometer A): A55-65

Tensile strength (ISO37): 4.0 MPa

Elongation at break (ISO37): 200%

Applied temperature range: −40° C. to +150° C.

(c) ACG-576 (acrylic-based) of UV-curable type [manufactured by Sekisui Chemical]

Chemical resistance: oil resistance

Hardness (Durometer A): 30

Tensile strength (ISO37): 2.1 MPa

Elongation at break (ISO37): 285%

According to battery pack 1 of the present embodiment, the size of sealing portion 240 can be reduced to reduce the cost of the material for forming sealing portion 240, and a fastening member for first member 210 and second member 220 to obtain strength of case 200 can be omitted, with the result that the manufacturing cost of battery pack 1 can be reduced without compromising the sealing characteristics of case 200.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery pack, comprising:

a plurality of battery cells arranged side by side along a first direction; and a case having an inner space accommodating the plurality of battery cells, wherein the case includes:

a first member, a second member that forms the inner space together with the first member, and a sealing portion that seals a joining portion between the first member and the second member, the first member and the second member are joined with each other in a second direction orthogonal to the first direction by the sealing portion without another fastening member other than the sealing portion, the first member has:

a cover portion extending along a plane orthogonal to the second direction, and a first portion in abutment with the sealing portion, the second member has:

a bottom portion extending along the plane, and a second portion facing the first portion, with the sealing portion being interposed between the second portion and the first portion, the first portion and the second portion constitute a side wall portion that connects the cover portion and the bottom portion, the first portion and the second portion face each other in a direction orthogonal to the second direction, the case is configured to, in response to an expansion pressure of the inner space acting on the case, cause a force in a shearing direction to act on the sealing portion sandwiched between the first portion and the second portion, and a tip of the first portion is inclined in a direction away from the second portion.

2. The battery pack according to claim 1, wherein the first portion is located on an outer side of the case with respect to the second portion.

3. The battery pack according to claim 1, wherein each of the plurality of battery cells has:

an upper surface provided with an electrode terminal, and a bottom surface facing the upper surface along the second direction orthogonal to the first direction, the bottom portion is located on a bottom surface side and faces the bottom surface of each of the plurality of battery cells, the cover portion faces the bottom portion along the second direction, the side wall portion is located between the bottom portion and the cover portion, and the sealing portion is formed along the side wall portion.

4. The battery pack according to claim 3, wherein the second member is located on a bottom portion side of the case with respect to the first member.

5. The battery pack according to claim 1, wherein the first portion is located on an outer side of the case with respect to the second portion, each of the plurality of battery cells has:

an upper surface provided with an electrode terminal, and a bottom surface facing the upper surface along the second direction orthogonal to the first direction, the bottom portion is located on a bottom surface side and faces the bottom surface of each of the plurality of battery cells, the cover portion faces the bottom portion along the second direction, the side wall portion is located between the bottom portion and the cover portion, and the sealing portion is formed along the side wall portion.

6. The battery pack according to claim 1, wherein the sealing portion has a thickness along the plane increasing from the cover portion toward the bottom portion.

* * * * *